(12) United States Patent
Nakanishi et al.

(10) Patent No.: US 7,610,435 B2
(45) Date of Patent: Oct. 27, 2009

(54) NONVOLATILE MEMORY DEVICE EMPLOYING A WRITE COMPLETION FLAG TABLE

(75) Inventors: Masahiro Nakanishi, Kyoto (JP); Tomoaki Izumi, Osaka (JP); Tetsushi Kasahara, Osaka (JP); Kazuaki Tamura, Osaka (JP); Kiminori Matsuno, Osaka (JP); Manabu Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 10/598,307

(22) PCT Filed: Feb. 25, 2005

(86) PCT No.: PCT/JP2005/003136

§ 371 (c)(1),
(2), (4) Date: Nov. 24, 2006

(87) PCT Pub. No.: WO2005/083573

PCT Pub. Date: Sep. 9, 2005

(65) Prior Publication Data

US 2008/0028129 A1    Jan. 31, 2008

(30) Foreign Application Priority Data

Feb. 27, 2004    (JP)    ............... 2004/053960

(51) Int. Cl.
*G06F 12/10*    (2006.01)
(52) U.S. Cl. .................. 711/103; 711/159; 711/202
(58) Field of Classification Search .............. None
See application file for complete search history.

(56) References Cited

U.S. PATENT DOCUMENTS

| 6,917,539 | B2 * | 7/2005 | Rinerson et al. | ............ 365/171 |
| 6,934,794 | B2 * | 8/2005 | Garritsen et al. | ............ 711/103 |
| 7,054,991 | B2 * | 5/2006 | Tanaka et al. | ............... 711/103 |
| 2003/0189860 | A1 | 10/2003 | Takeuchi et al. | |

FOREIGN PATENT DOCUMENTS

| JP | 2001-005928 | 1/2001 |
| JP | 2003-015929 | 1/2003 |

OTHER PUBLICATIONS

Machine Translation of JP 2001-005928; Jan. 12, 2001. All pages.*
English Language Abstract of JP 2001-005928.
English Language Abstract of J 2003-015929.
U.S. Appl No. 10/597,650 to Kasahara et al., filed Aug. 2, 2006.
U.S. Appl. No. 11/568,470 to Tamura et al., filed Oct. 30, 2006.
U.S. Appl. No. 11/568,564 to Kasahara et al., filed Nov. 1, 2006.

* cited by examiner

*Primary Examiner*—Than Nguyen
(74) *Attorney, Agent, or Firm*—Greenblum & Bernstein, P.L.C.

(57) ABSTRACT

A writing completion flag table that stores a writing completion flag corresponding to a predetermined storage, such as a cluster or a physical block, is stored in a non-volatile control memory. When completion of data writing into a predetermined storage is detected, a write completion flag is written in the corresponding address of the storage on the write completion flag table. Thus, it is possible to recognize that data has been written normally. Even when the flag indicating completion of writing into a page of the writing unit of the main storage memory cannot be written, it is possible to improve the writing reliability.

12 Claims, 10 Drawing Sheets

| Page0 | 0 | 1 | 2 | 3 | MR |
| Page1 | 0 | 1 | 2 | 3 | MR |
| ... | | | | | |
| Page126 | 0 | 1 | 2 | 3 | MR |
| Page127 | 0 | 1 | 2 | 3 | MR |

F I G. 5

| | | | | | |
|---|---|---|---|---|---|
| Page 0 | 0 | 1 | 2 | 3 | MR |
| Page 1 | 0 | 1 | 2 | 3 | MR |
| Page 126 | 0 | 1 | 2 | 3 | MR |
| Page 127 | 0 | 1 | 2 | 3 | MR |

F I G. 7
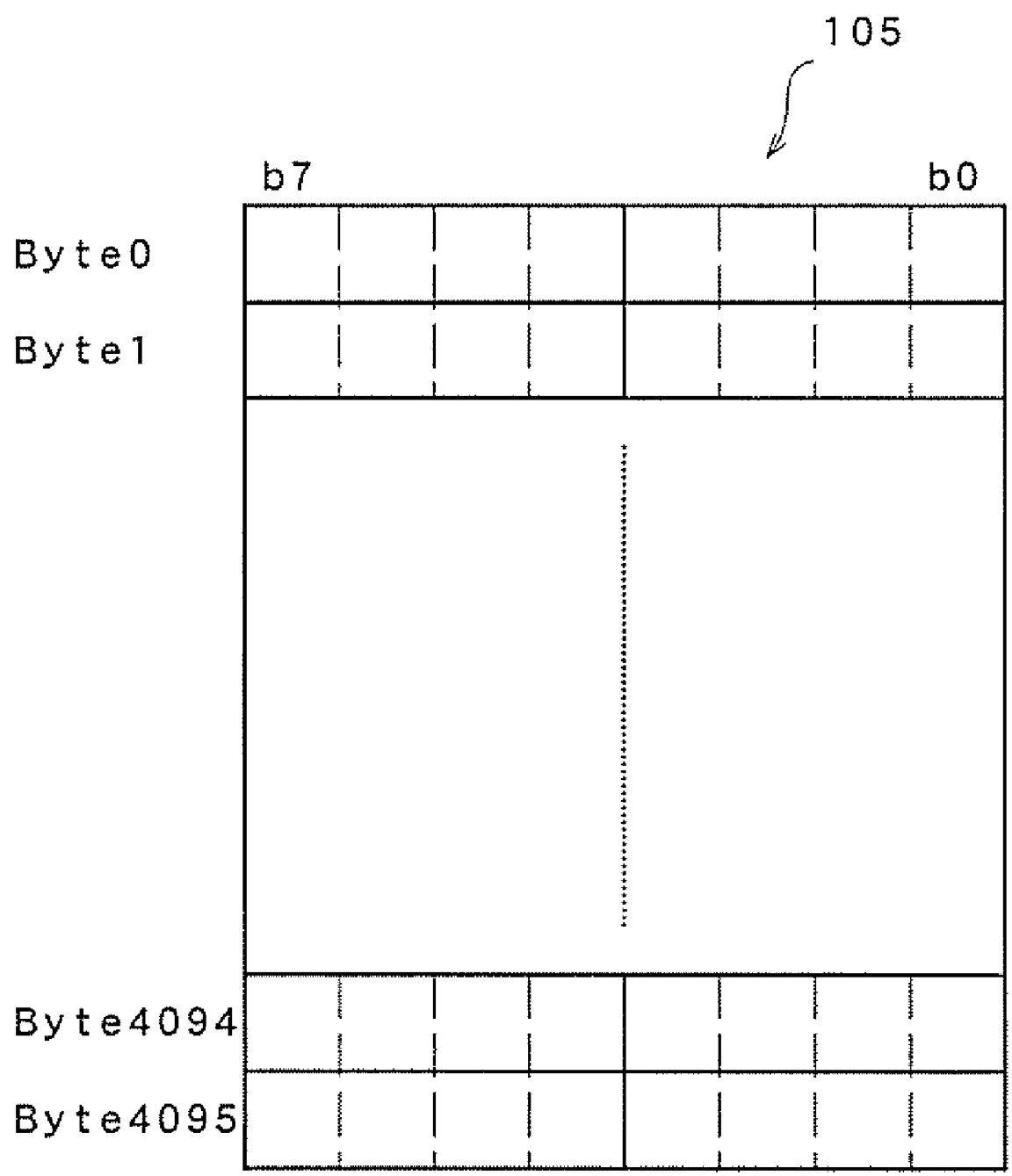

F I G. 10
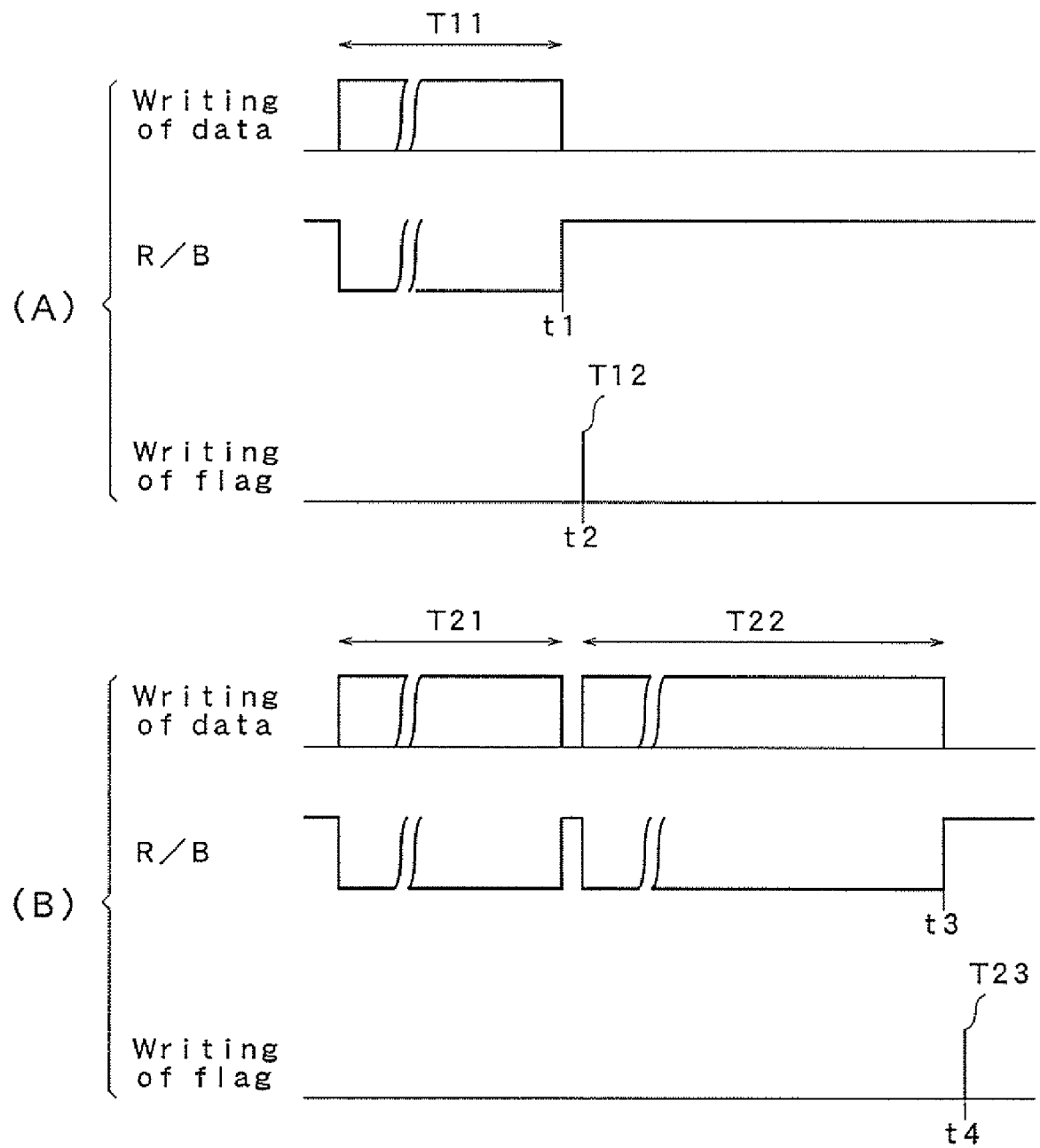

F I G. 1 2

NONVOLATILE MEMORY DEVICE EMPLOYING A WRITE COMPLETION FLAG TABLE

TECHNICAL FIELD

The present invention relates to a memory device using semiconductor, and, more in detail, relates to a semiconductor memory device using non-volatile memory as semiconductor memory for a main memory.

BACKGROUND ART

Since a memory card such as an SD memory card and compact flash (registered trademark) is small-sized among semiconductor memory cards, it is provided in practical use as a detachable memory device of portable device such as a digital still camera.

A semiconductor memory device provided in practical use usually has at least one flash memory, which is non-volatile memory and a controller LSI of its control circuit built-in inside. Recently, as needs for high enlargement of capacity of the semiconductor memory device are increasing, high enlargement of capacity of non-volatile memory chip in itself is also progressing. In addition, as mounting technique develops, the number of non-volatile memory chips mounted in semiconductor memory device increases and the chips over 1 GB as memory space of semiconductor memory device are put into practical use.

There are two main methods for management of address management information in the flash memory. The first method is a method for storing address management information together, in a whole memory region of a memory card or in every area that is made by dividing the whole memory region into predetermined number, in predetermined block. This address management method is called as a concentrated address management method.

In the second method, when data is written in predetermined page (sector) consisting of physical block, management information, namely status information showing effectiveness of the data and logical addresses are written in a redundancy region of a physical block in which the page is included. And the method is for composing an address management table in a memory by reading management information dispersively written in respective physical blocks at power activation. This address management method is called as a dispersive address management method. The present invention assumes the dispersive address management method.

Next, an example of a main storage memory of a semiconductor memory device in the dispersive address management method will be explained. It is assumed that the main storage memory has a capacity of 4 G bits, that is to say, 512 M bytes. A main storage memory 11 consists of a plurality of physical blocks, for example, 2048 physical blocks including from PB0 to PB2047. It is assumed that data capacity of respective physical blocks is 256 kB (bytes). It is assumed that this main storage memory is a binary NAND flash memory.

FIG. 2 is an explanation view showing one physical block. Respective physical blocks are composed of 128 pages including page 0 to page 128 in this example. Respective pages are composed of management region (MR) and data region of 4 sectors including sector 0 to sector 3. One sector has a capacity of 512 B and respective pages have a data region of 2048 B in total. The management region has a capacity of 64 B. A state code showing validity or invalidity of the data, writing completion flag and ECC code for error collection are included in the management region. The ECC code has a function of 1 or 2 bits error correction in its data region. Since this main storage memory is a binary NAND flash memory, independent writing becomes possible in units of pages, in only sector in the page, or in only a part of the management region in the sector.

FIG. 3 is a time chart showing writing or rewriting of data of 1 cluster (16 kB). In this example, Data is written in page 0 to page 7 in one physical block. Writing time T1 is, for example, a few milliseconds. And, immediately after a completion of writing of page 7, a writing completion flag is written in the management region of the page 7 in FIG. 2. Writing time T2 is, for example, 200 to 300 microseconds. And further, in the case of rewriting, a processing that copies data written in other block to new physical block is performed in addition to the writing in page 0 to page 7. It is assumed that the rewriting time is T3. The writing completion flag is written in page 7, 15, ... 127 that are last pages of respective valid clusters (T2).

In doing so, time to write the writing completion flag in the main storage memory is required, however, in the case where the power-off happened, it can be determined whether the data writing succeeded or failed on the basis of the fact that the writing completion flag in this management region had been written or not written at the time of the power-on after the power-off. Reliability improves since clusters or blocks including pages that have the writing completion flag can be handled as that which records assured data. (see Patent document 1).

Patent document 1: Unexamined Patent Publication 2003-15929.

DISCLOSURE OF INVENTION

Problems to be Solved by the Invention

Recently, a multiple-valued NAND flash memory has drawn attention as memory cells that can take more than two conditions in one cell, that is to say, as a multiple-valued flash memory. The multiple-valued flash memory, however, is a product realizing large-capacity at low cost, it is unable to perform a parted writing to a page of a writing unit. In fact, after writing data in certain region of the page, it is impossible to write data in other region of the same page without erasing. By such restriction, after writing data in conventional way, the writing completion flag cannot be written in a management region in the written page in a case where the multiple-valued NAND flash memory is used as a main storage memory.

Without writing the writing completion flag, writing rate becomes higher but reliability descends, it causes difficulty of power-off measures accordingly. For this reason, it is required to set up a writing completion flag region in physical region different from data writing region and to write the writing completion flag in the region in order to secure the reliability.

However, in a case where a capacity of 512-MB (bytes) of main storage memory is used, if other physical region is set up, it is required to acquire a region where the 32 k pieces of the writing completion flags can be written in accordance with the following equation (1).

$$512\ MB/16\ kB = 32\ kPCS \qquad (1)$$

However, even though the writing completion flag is assumed to be one bit, it is required to acquire a capacity of one page (2 kB) for the one bit since it is unable to perform the parted writing to a page of the writing unit. Accordingly, a capacity of a physical block allotted for the writing completion flags becomes 64 MB in accordance with the following equation (2).

$$32\ kPCS \times 2\ kB = 64\ MB \qquad (2)$$

For that reason, it occurs a problem that usable region to record data is considerably decreased.

The present invention, using non-volatile memory as a main storage memory, is to achieve high-rate writing in keeping higher reliability as the problem to be solved.

MEANS TO SOLVE THE PROBLEMS

A semiconductor memory device of the present invention comprises: a non-volatile main storage memory including a storage region consisting of a plurality of storage capacity units which are composed of a data region in a first storage capacity and management region; an address management information storage part for storing address management information of said main storage memory; a non-volatile control memory for storing a writing completion flag table which is provided to said main storage memory every second storage capacity unit and consists of writing completion flags placed when data writing is completed; and a control part for performing read/write control for said main storage memory in accordance with a direction of data read/write from a host and for performing update control for said address management information storage part and said control memory.

Here, said second storage capacity unit is a cluster size, and said control memory may record the writing completion flag table consisting of writing completion flags of at least one bit for every cluster size prescribed by a file system of the host.

Here, said second storage capacity unit is a sector size, and said control memory may record the writing completion flag table consisting of writing completion flags of at least one bit for every sector size prescribed by a file system of the host.

Here, said second storage capacity unit is a physical block size, and said control memory may record the writing completion flag table consisting of writing completion flags of at least one bit for every capacity of N number of physical blocks in said main storage memory.

Here, said control memory may have higher writing-rate than that of said main storage memory.

Here, said control part may compose a memory map of the writing completion flag table at initialization or factory shipment based on a preliminarily stored second storage capacity unit.

Here, said control part may compose a memory map of the writing completion flag table at initialization or factory shipment based on a second storage capacity unit transferred from the host.

Here, said main storage memory may be a multi-valued NAND flash memory.

Here, said address management information storage part may include: a physical region management table for storing conditions every storage capacity unit of said main storage memory; and an address conversion table for converting an address designated by a file system of the host into an address of a storage capacity unit of said main storage memory.

Here, said control memory may be a ferroelectric random access memory (FeRAM), magnetic random access memory (MRAM), ovonic unified memory (OUM), or resistance RAM (RRAM).

EFFECTIVENESS OF THE INVENTION

In the present invention, the writing completion flag is written in a control memory in response to data writing to the main storage memory. For that reason, even though the power-off occurs during data writing to the main storage memory, it can be judged whether data was correctly written before the power-off or not by checking existence or non existence of the writing completion flag to which the control memory corresponds at the power-on immediately after the power-off. In addition, a higher writing-rate processing than the writing-rate of a conventional semiconductor memory device can be realized by using a higher writing-rate memory than the writing-rate of the main storage memory in at least one byte writing.

BRIEF DESCRIPTION OF DRAWINGS

FIG. 5 is an explanation view of a physical block in the embodiment.

FIG. 7 is an explanation view of a writing completion flag table in the embodiment.

FIG. 10 is a time chart showing writing and rewriting of one cluster in the embodiment.

FIG. 12 is an explanation view of a writing completion flag table in another embodiment.

DESCRIPTION OF REFERENCE NUMERALS

Figure 1:
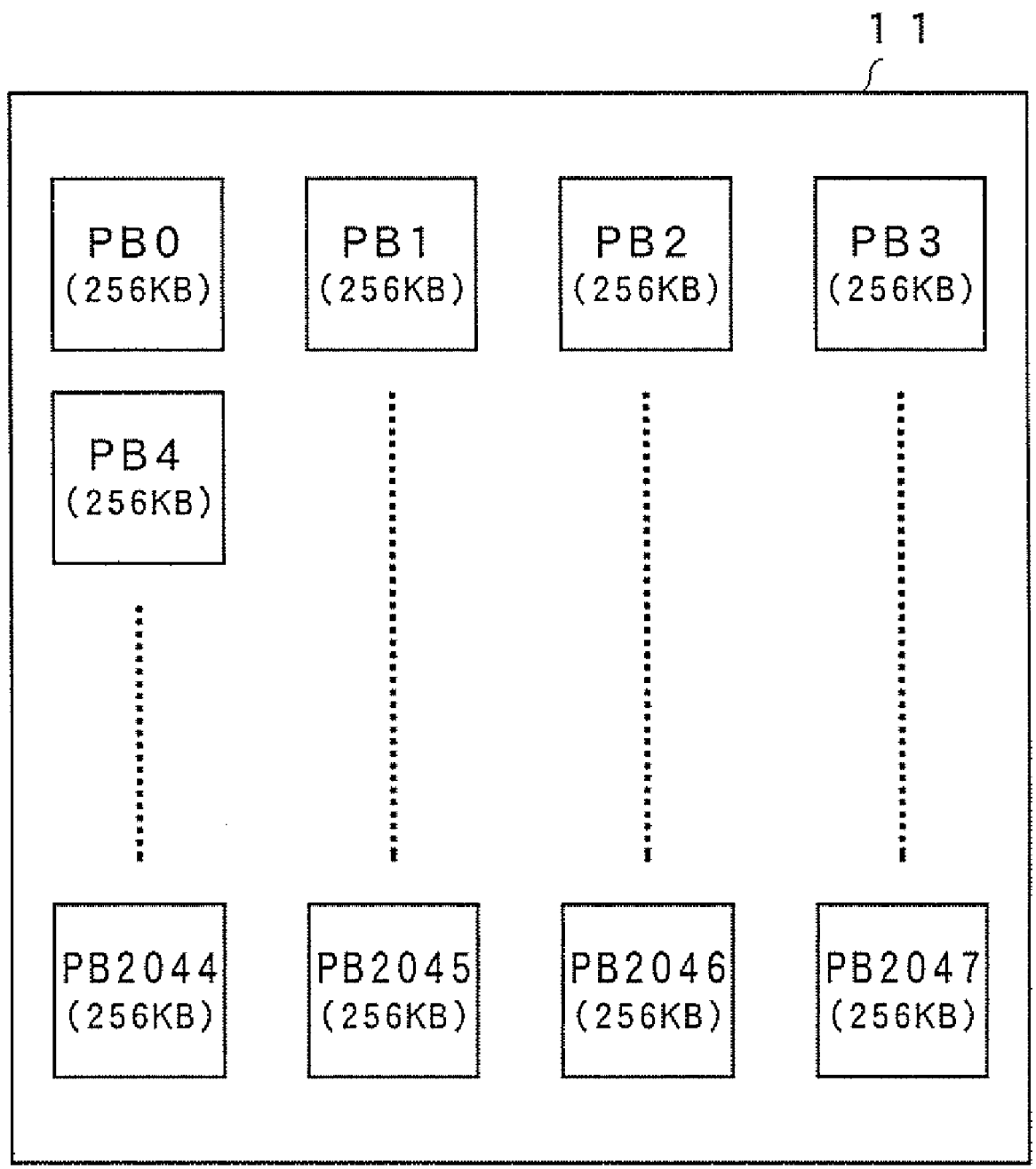
FIG. 1 is a view showing a configuration of a main storage memory in a conventional semiconductor memory device.
Figures 2, 3:
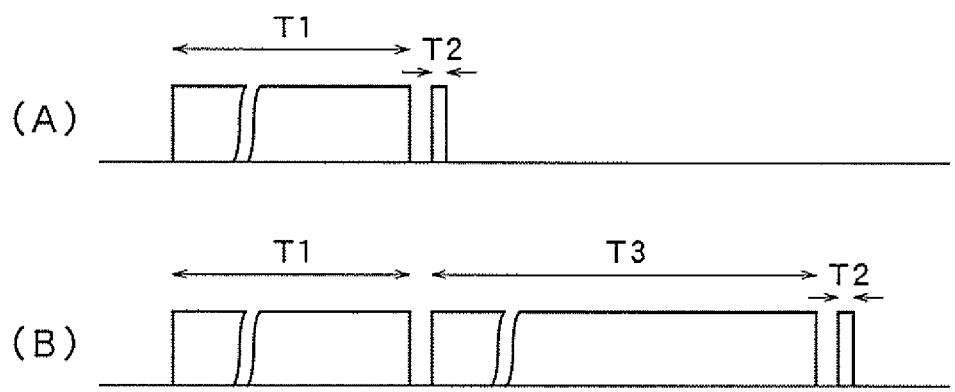
FIG. 2 is a view showing a configuration of a physical block in the conventional main storage memory.
FIG. 3 is a time chart showing conventional writing and rewriting of one cluster.

100 Host
102 Control part
103 RAM
104 ROM
105 Writing completion flag table
106 Control memory
107 Memory access part
108 Address conversion table
109 Physical region management table
110 Address management information storage part
111 Memory controller
112 Main storage memory

BEST MODE FOR CARRYING OUT THE INVENTION

Figure 4:
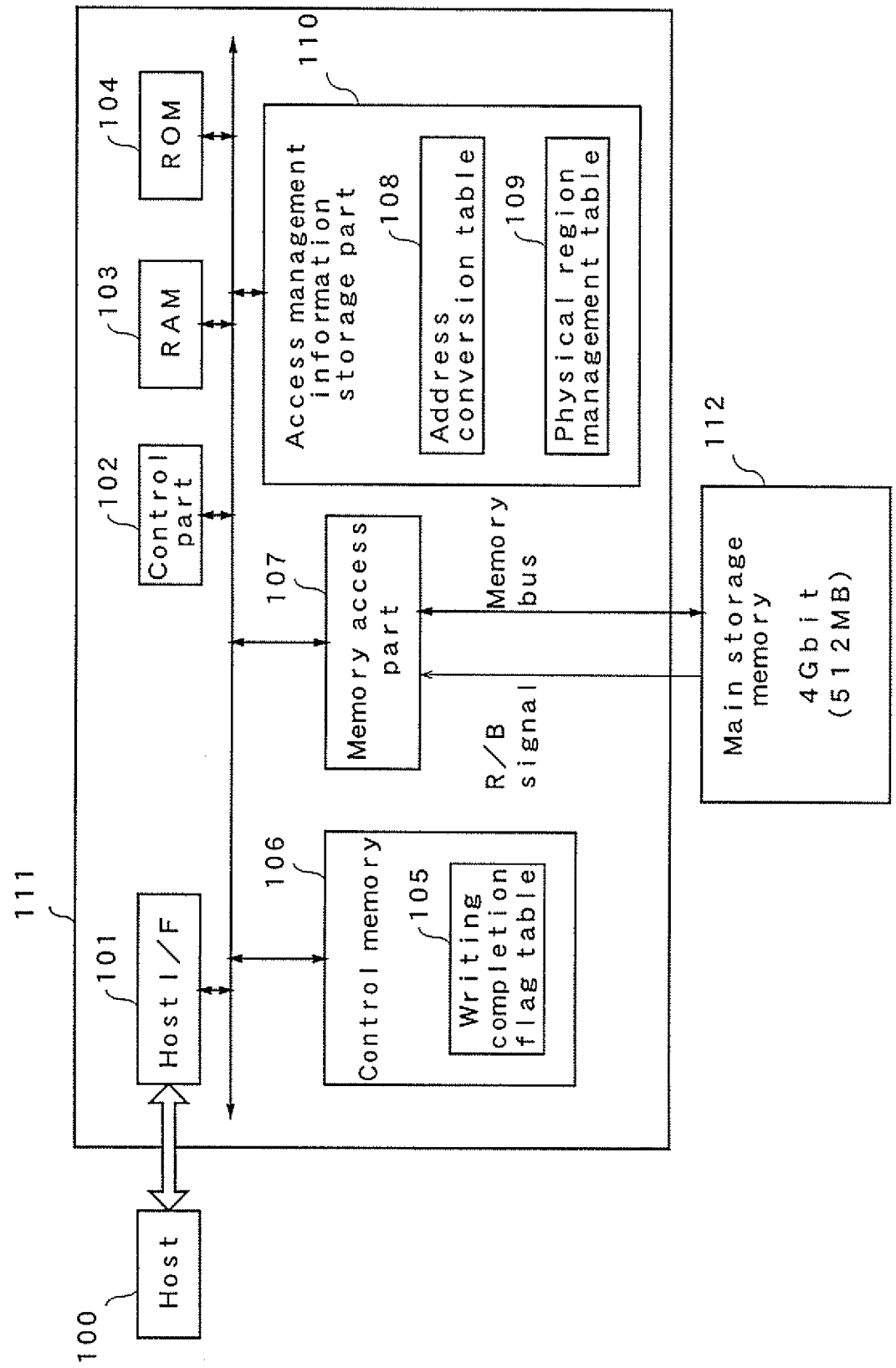
FIG. 4 is an overall configuration view of a semiconductor memory device in an embodiment of the present invention.

A semiconductor memory device in an embodiment of the present invention will be explained referring to figures. FIG. 4 is an overall configuration view of a semiconductor memory device in the embodiment. The semiconductor memory device consists of a memory controller 111 and non-volatile memory (hereinafter, simply referred to as a main storage memory) 112 for a main storage. A host 100 is an access device for transferring read/write commands and read/write addresses of user data (hereinafter, referred to as data) and data to the main storage memory 112 via the memory controller 111. The memory controller 111 is composed by including a host I/F 101, control part 102, RAM 103, ROM 104, non-volatile memory for control (hereinafter, simply referred to as a control memory) 106, memory access part 107, and address management information storage part 110.

Next, the main storage memory 112 will be explained. In this embodiment, the main storage memory 112 has a capacity of 4 Gbits, that is to say, 512 Mbytes. The main storage memory 112 consists of a plurality of physical blocks, for example, 2048 physical blocks of PB0 to PB 2047 as described in FIG. 1. A data capacity of each physical block is 256 kB (bytes). This main storage memory 112 is a multiple-valued NAND flash memory.

FIG. 5 is an explanation view of a physical block in the embodiment. Respective physical blocks consist of 128 pages of page 0 to page 127. Respective pages consist of data region of 4 sectors of sector 0 to sector 3 and management region (MR). Data capacity unit in one page is a first capacity unit here and the management region is included corresponding to the capacity unit. The management region has a capacity of 64 B. In the management region, a condition code for indicating validity or invalidity of the data and ECC code for error correcting are included but the writing completion flag is not included. Since this main storage memory 112 is the multiple-valued NAND flash memory, only writing in units of pages is possible and writing only in sector in page or only in a part of the management region in sector independently is impossible.

Figure 6:
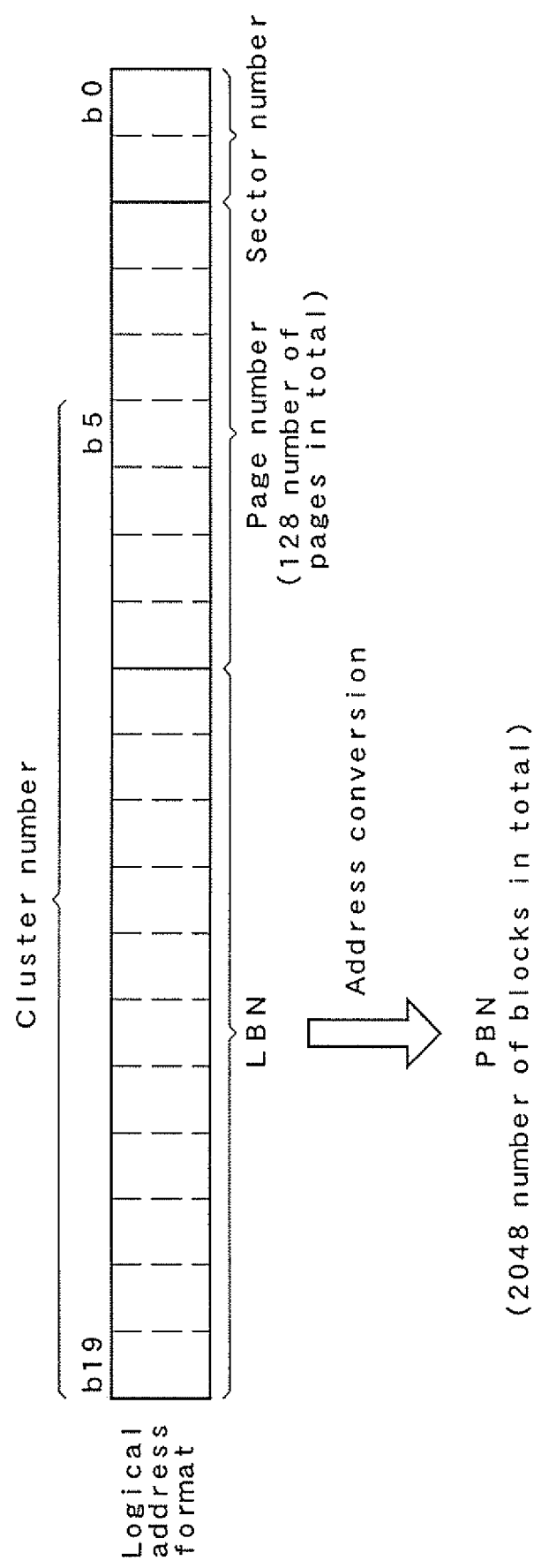
FIG. 6 is an explanation view of a logical address format in the embodiment.

FIG. 6 is an explanation view of a logical address format in the embodiment. A sector number, page number, and logical block number (LBN) are there in order from lower bit in FIG. 6 and 11 bits corresponding to a logical block number correspond to an object of address conversion, that is to say, an address of the address conversion table 108. In addition, if a sector size prescribed by a file system of the host 100 is 512 B and a cluster size is 16 kB, an LSB in the cluster number corresponds to the bit b5 in the logical address format.

The control part 102 performs an overall control in the memory controller 111, read/write control of data for the memory access part 107 in accordance with a read/write instruction of data from the host 100, and update control of the address management information storage part 110 and control memory 106 and is composed by including a CPU. The RAM 103 is a RAM for working of the control part 102. The ROM 104 is a ROM for storing programs that the control part 102 executes. The control memory 106 is a non-volatile memory for storing the writing completion flag table 105. It is preferable that the writing-rate in units of one bit, or one byte or under of the control memory 106 is faster than that of the main storage memory 112. The control memory 106 may use a ferroelectric random access memory (FeRAM), magnetic random access memory (MRAM), ovonic unified memory (OUM), or resistance RAM (RRAM). The FeRAM is used for the control memory 106 here. FeRAM can overwrite or is not required to erase when rewriting and has advantages in higher writing-rate in small capacity, for example, in units of one bit or one byte compared to general flash memories.

The writing completion flag table 105 in the control memory 106 is a table for writing the writing completion flag in corresponding logical address immediately after writing data transferred by the host 100 in the main storage memory 112.

FIG. 7 is an explanation view of a writing completion flag table 105 in the embodiment. The writing completion flag is placed every second storage capacity unit and indicates writing in the unit, and FIG. 7 shows a case where the flag is written every the second storage capacity unit, here, every one cluster (16 kB) or every eight pages. That is to say, since the writing completion flag is recorded in cluster unit, the writing completion flag corresponding to one logical block is 2 bytes.

The writing completion flag table 105, that is, the control memory 106 has a capacity of 4 kB in this case. The writing completion flag (one bit) of 32 kilo clusters is arranged in order of the clusters from b 0 of byte 0. And, a value "1" is written in corresponding bit immediately after data of corresponding cluster is written in the main storage memory 112.

Next, the memory access part 107 is an access part for performing read/write and erase control of the main storage memory 112.

Next, the address management information storage part 110 is a memory for temporarily storing the address conversion table 108 and physical region management table 109. This memory may be a volatile memory such as RAM or may be a non-volatile memory.

Figure 8:
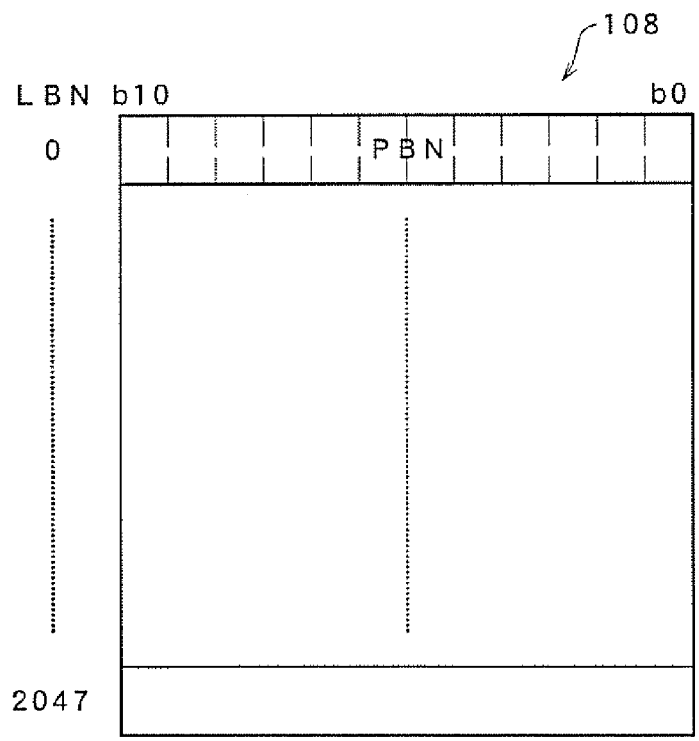
FIG. 8 is an explanation view of an address conversion table in the embodiment.

FIG. 8 is an explanation view of an address conversion table 108 in the embodiment. The address conversion table 108 is a table for converting a logical address transferred by the host 100 into a physical address in the main storage memory 112. In FIG. 8, the address corresponds to a logical block number (LBN) of the logical address specified by the host 100 and a physical block number (PBN) corresponding to the address is stored in the address conversion table 108.

Figure 9:
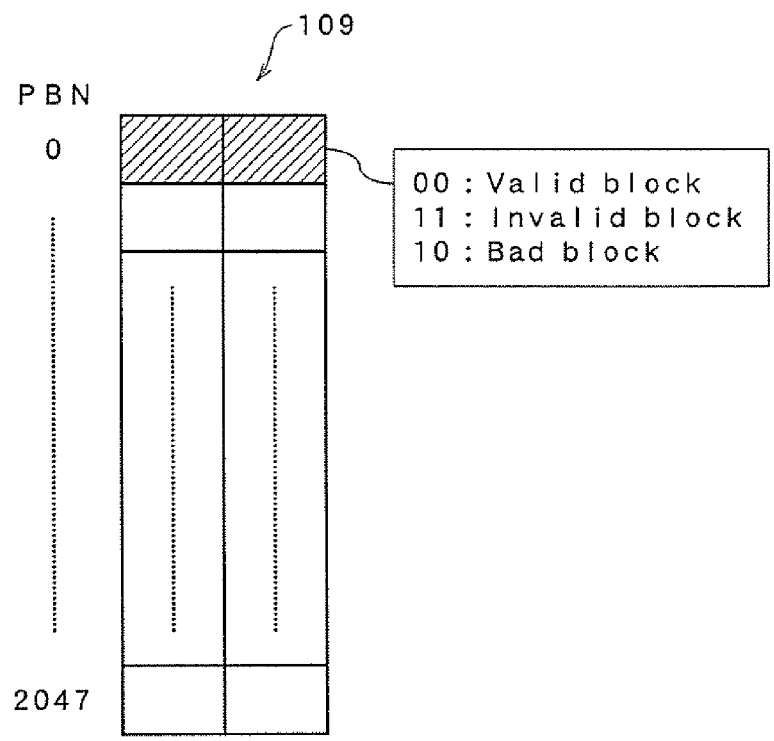
FIG. 9 is an explanation view of a physical management region table in the embodiment.

FIG. 9 is an explanation view of a physical management region table 109 in the embodiment. The physical region management table 109 is a table for storing a condition of a physical region in main storage memory 112, for example, a condition of a physical block as erase unit. The condition of a physical region indicates whether valid data is written or not, for example. In FIG. 9, addresses in the physical region management table 109 correspond to respective physical block numbers PSN of the main storage memory 112 and stores conditions of respective physical blocks. Value "00" in binary indicates a valid block storing valid data. Value "11" indicates an erased block or invalid block in which unnecessary data is written. Value "10" indicates a bad block that cannot be used because of a solid error on a memory cells or like.

First, contents of the main storage memory 112 and various tables just after the shipping of the semiconductor memory device will be explained. Explanation of a system region in the main storage memory 112 is omitted to simply describe and only a normal region, that is to say, a region in which user reads/writes data will be explained. The control part 102 composes a memory map of the writing completion flag table on the basis of a predetermined storage capacity unit preliminarily stored in the ROM 104 or main storage memory 112 at initialization or factory shipment. In this case, a memory map of the writing completion flag table 105 is composed in units of clusters as described in FIG. 7. All bits in the writing completion flag table 105 are set to value "0" at initialization or factory shipment.

In addition, good blocks of the main storage memory 112 are in all erased condition. The good blocks in the physical region management table 109 are in an invalid block condition, which takes the binary value "11", and initial bad blocks are bad blocks, which take the binary value "10". The address conversion table 108 takes a value "0" in all bits. Incidentally, Any value can be taken.

An operation of this semiconductor memory device will be explained. The semiconductor memory device in this embodiment reads management information held in management regions of respective physical blocks in the main storage memory 112 at the power-on since the device adopts a dispersive address management method. And then, the tables 108 and 109 are composed in the address management information storage part 110.

Next, a case where the writing completion flag is stored every time of writing in one cluster will be explained. After setting a receiving condition of commands such as read/write commands from the host 100, direction of writing to arbitrary logical address is made from the host 100. Writing in a cluster unit will be explained below because the host 100 usually writes in the cluster unit.

FIG. 10(A) is a time chart showing writing of one cluster in the embodiment. The host 100 transfers direction of writing in arbitrary cluster and corresponding logical address to the memory controller 111. When direction of writing in arbitrary cluster is transferred from the host 100, bits of the writing completion flag of 2 bytes corresponding to logical block including the cluster are reset and take value "0". The control part 102 searches invalid blocks in descending order from a side of 0th address of the physical region management table 109, sets firstly searched invalid block as a target block of writing, and writes transferred data after erasing the physical block in the main storage memory 112. This writing time T11 is a few milliseconds.

In FIG. 10, the control part 102 writes value "1" in corresponding bit in the writing completion flag table 105 on the basis of a rising edge of a busy signal (R/B signal) feed backed from the main storage memory 112 at time t2 just after the time t1 when a sequence of writing operation completed. This writing time T12 is around 100 nanoseconds because the FeRAM is used in the control memory 106.

Figure 11:
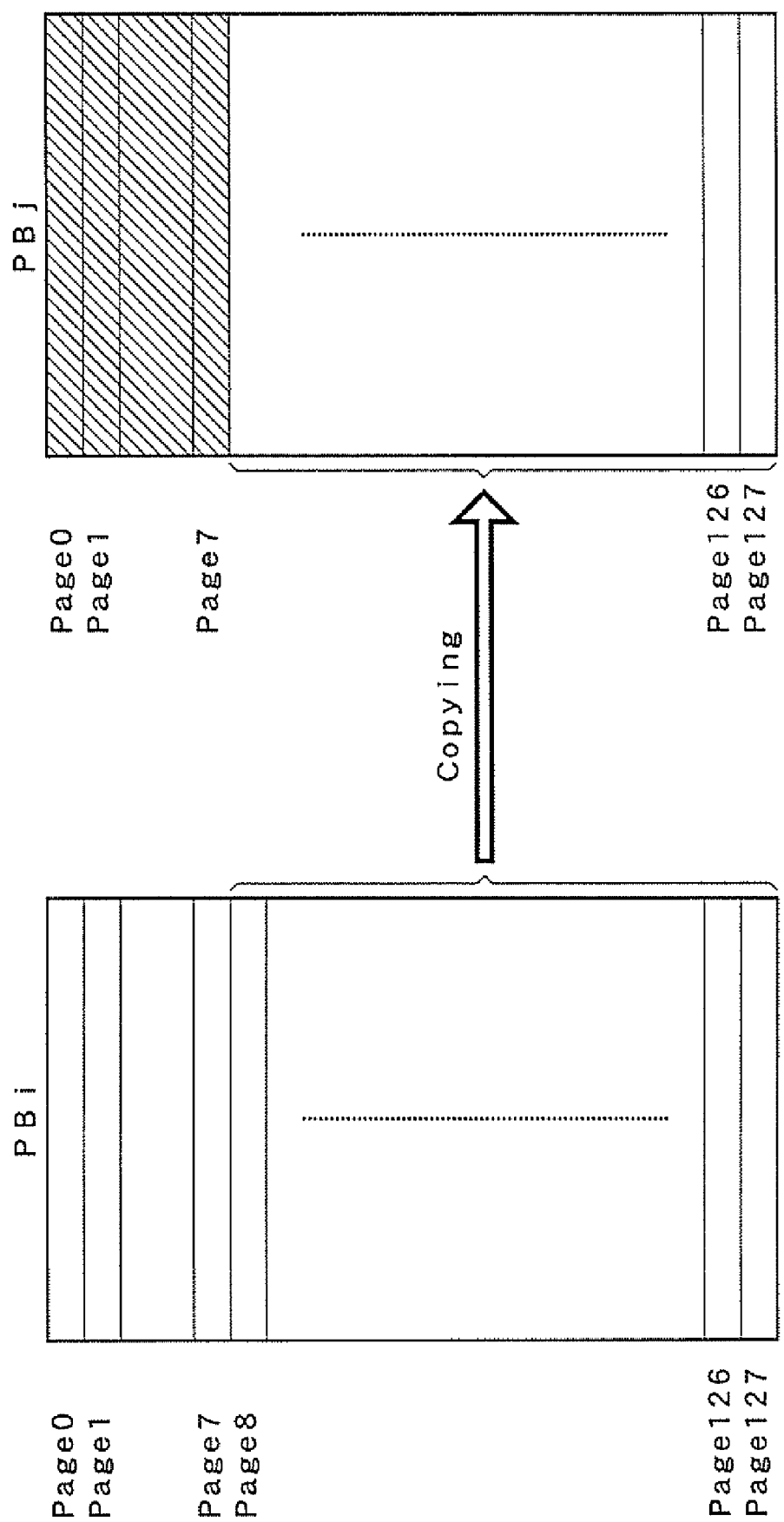
FIG. 11 is an explanation view showing a rewriting operation of one cluster in the embodiment.

On the other hand, when a physical block corresponding to a logical block number including target block of writing is a valid block, it is determined that data is already written in other pages of the logical block. FIG. 11 is an explanation view showing a rewriting operation in one cluster. In FIG. 11, a physical block PBi is a physical block in which data is written in all pages from page 0 to page 127. A case where pages 0 to 7 of one cluster in this physical block PBi are rewritten will be explained. A physical block PBj is a new physical block prepared for rewriting and is a physical block in which invalid data is written. In this case, new data of one cluster is written in target pages 0 to 7 of the physical block PBj. Subsequently, 120 pages of pages 8 to 127 in the existing physical block PBi are copied to the physical block PBj. The writing completion flag is used for that the control part 102 determines whether copying of remaining pages is required or not.

In FIG. 10(B), T21 is a time of writing in pages 0 to 7 of the main storage memory 112 and is a few milliseconds for example. After completion of this, 120 pages of pages 8 to 127 are copied. This writing time T22 is dozens milliseconds. The control part 102 writes writing completion flags in the writing completion flag table 105 on the basis of a rising edge of a busy signal (R/B signal) feed backed from the main storage memory 112 at time t4 just after the time t3 when a sequence of writing operation completed. This writing time T23 is around 100 nanoseconds. In this flag writing, the writing completion flag is shown by placing "1" in bit corresponding to respective clusters since all physical blocks of 127 pages is written.

As described above, the writing completion flag table 105 is mapped on non-volatile memory in bit arrangement corresponding to clusters and writing completion flags are written in the writing completion flag table 105 after completion of a sequence of writing operation. Consequently, it can be determined whether data has normally written or not by that the control part 102 checks contents of the writing completion flag table 105 at initialization after the power-off even though the power-off occurs during data writing.

Next, a processing for confirming writing reliability by using writing completion flags at power-on will be explained.

First, the control part 102 searches the physical region management table 109, and checks valid physical blocks. And then, the control part 102 searches a valid logical block address corresponding to a valid physical block from the address conversion table 109. After that, the control part 102 checks the writing completion flag table 105 corresponding to the valid logical block address. At this time, writing completion flags corresponding to one logical block amount to 2 bytes since the writing completion flags are recorded in units of clusters. Consequently, the control part 102 searches the writing completion flag table 105 every two bytes from the upper byte (byte 0) in the order of logical block address 0, 1, 2, and . . . . When groups of the 2 bytes of the writing completion flag table corresponding to the valid logical block address are all "0", it is determined that the logical block has a possibility that data is not correctly written by the power-off occurred during data writing. In this case, the logical block turns to invalid logical block. In other words, corresponding physical block address is checked on the basis of the address conversion table 108 and a condition of physical block in the physical region management table 109 turns to invalid condition.

In this way, a highly reliable semiconductor memory device using simple circuitry can be provided without considerably reducing usable region for data even when a non-volatile memory unable to perform divided writing for a page of a writing unit is used as the main storage memory 112.

In addition, if a non-volatile memory having high-rate writing at a small capacity (at least one bit to one byte) such as FeRAM is provided for the writing completion flag table 105, it is possible to shorten a writing time of the writing completion flag, and to improve an overall writing rate.

Further, in the present embodiment, though the second storage capacity unit for recording a writing completion flag is a unit by each cluster as show in FIG. 7, it may set a unit to a physical block (256 kB) unit as shown in FIG. 12 and the writing completion flag may be written in this unit. In addition, by setting the second storage capacity unit to a sector unit or page unit, the writing completion flag may be written in this unit.

Furthermore, though a multiple-valued NAND flash memory is used as the non-volatile main storage memory 112, a binary NAND flash memory and AGAND type flash memory may be used as a main storage memory. And, non-volatile memory other than the flash memory may be used. Further, a plurality of non-volatile memory chips may be incorporated.

In the embodiment, a memory map of a writing completion flag table is composed at initialization or factory shipment based on a preliminarily stored storage capacity unit. Alternatively, a constitution of the writing completion flag table may be determined by that a host transfers a value of a predetermined storage capacity unit.

INDUSTRIAL APPLICABILITY

A semiconductor memory device of the present invention can realize high reliability and high-rate processing by using a simple circuitry especially in a memory device using a non-volatile memory of large capacity as a main storage memory. For this reason, it is useful to devices using the semiconductor memory device, for example, various devices such as a still image recording/reproducing device, motion picture recording/reproducing device, and mobile phone.

The invention claimed is:

1. A semiconductor memory device, comprising:
   a non-volatile main storage memory including a plurality of physical blocks, each physical block having a plurality of storage capacity units composed of a data region in a first storage capacity and a management region;
   an address management information storage that stores address management information of said main storage memory and a block status of each physical block indicating whether data stored in the block is valid or not;
   a non-volatile control memory that stores a writing completion flag table which is provided to said main storage memory every second storage capacity smaller than said first storage capacity and consists of writing completion flags placed when data writing is completed to each of said second storage capacity; and
   a controller that performs read/write control for said main storage memory in accordance with a direction of data read/write from a host and for performing update control for said address management information storage part and said non-volatile control memory.

2. The semiconductor memory device according to claim 1, wherein
   said second storage capacity is a cluster size, and
   said non-volatile control memory records the writing completion flag table by writing completion flags of at least one bit for every cluster size prescribed by a file system of the host.

3. The semiconductor memory device according to claim 1, wherein
   said second storage capacity is a sector size, and
   said non-volatile control memory records the writing completion flag table by writing completion flags of at least one bit for every sector size prescribed by a file system of the host.

4. The semiconductor memory device according to claim 1, wherein
   said non-volatile control memory has a higher writing-rate than that of said non-volatile main storage memory.

5. The semiconductor memory device according to claim 1, wherein
   said controller includes a memory map of the writing completion flag table at initialization or factory shipment, based on a preliminarily stored second storage capacity unit.

6. The semiconductor memory device according to claim 1, wherein
   said controller includes a memory map of the writing completion flag table at initialization or factory shipment, based on a second storage capacity unit transferred from the host.

7. The semiconductor memory device according to claim 1, wherein
   said non-volatile main storage memory comprises a multi-valued NAND flash memory.

8. The semiconductor memory device according to claim 1, wherein
   said address management information storage includes a physical region management table that stores conditions for every storage capacity unit of said main storage memory; and an address conversion table that converts an address designated by a file system of the host into an address of a storage capacity unit of said main storage memory.

9. The semiconductor memory device according to claim 1, wherein
   said control memory comprises a ferroelectric random access memory (FeRAM).

10. The semiconductor memory device according to claim 1, wherein
    said control memory comprises a magnetic random access memory (MRAM).

11. The semiconductor memory device according to claim 1, wherein
    said control memory comprises an ovonic unified memory (OUM).

12. The semiconductor memory device according to claim 1, wherein
    said control memory comprises a resistance RAM (RRAM).

* * * * *